Patented Mar. 6, 1923.

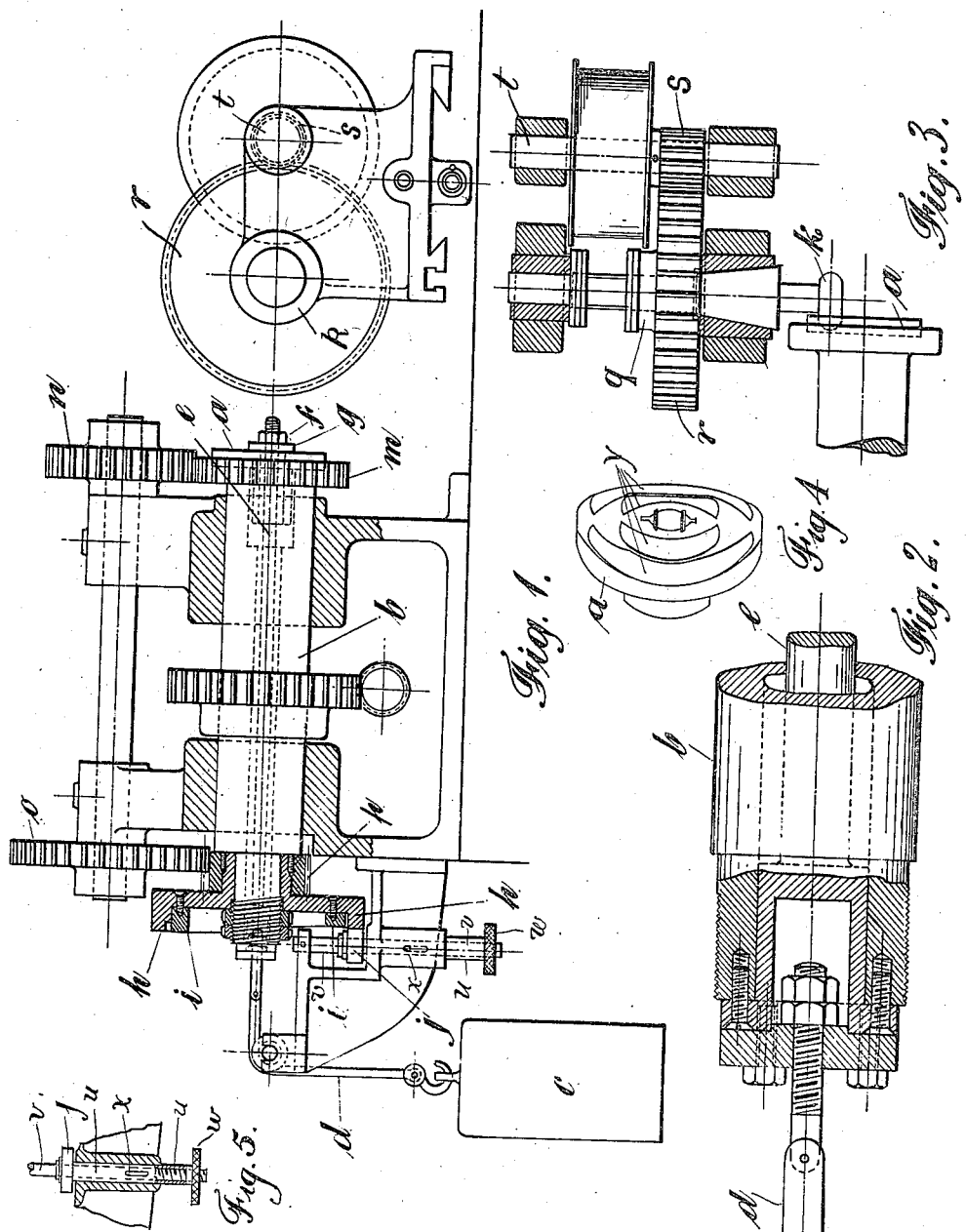

1,447,552

UNITED STATES PATENT OFFICE.

JOSEPH HIGGINSON AND HUBERT ARUNDEL, OF STOCKPORT, ENGLAND.

DIFFERENTIAL OR BALANCE GEARING.

Application filed January 11, 1921. Serial No. 436,552.

*To all whom it may concern:*

Be it known that we, JOSEPH HIGGINSON and HUBERT ARUNDEL, subjects of the King of Great Britain and Ireland, and residents of Sovereign Works, Stockport, in the county of Chester, England, have invented certain new and useful Improvements in Differential or Balance Gearing (for which we have obtained a patent in Great Britain, No. 151375, dated June 25th, 1919), of which the following is a specification.

This invention relates to differential or balance gearing of the type described in the specification of British Patent No. 9804 of 1915 in which a driving member has a number of balls therein to co-act with opposed annular undulating cam surfaces on two driven members. It is usual to have two sets of concentric cam grooves or tracks in the driven members.

We have found that we obtain good results with this type of differential gear if the incline or acting face of each undulating cam groove both in the inner and outer tracks has the same degree of inclination and is of the same length, the difference in overall length of the grooves being provided for by the elongated top or bottom or inactive parts of the undulations, where no locking action upon the balls occurs.

Our invention therefore comprises the formation of the concentric cam grooves of differential or balance gearing of the type aforesaid with inclines or active faces of similar inclination and of the same length so that the wedging action upon the balls is equal for all the cam grooves.

Our invention further comprises the production of the cam grooves in the concentric tracks of the driven members by the aid of two formers adapted to give all the cam grooves inclines of equal angles.

Referring to the accompanying sheet of explanatory drawings:—

Figure 1 is an elevation partly in section of portions of a machine for producing the cam grooves of a differential gear in accordance with our invention, the milling tool being somewhat removed from the remainder of the mechanism.

Figure 2 is a detail view drawn to an enlarged scale to be hereinafter referred to.

Figure 3 is a plan view of the arrangement of the milling tool for cutting the cam grooves.

Figure 4 is a perspective view of the grooved plate to be produced.

Figure 5 is a fragmentary detail section of the adjusting means for the former engaging roller.

The same reference letters in the different views indicate the same parts.

The disc or plate $a$ in which the concentric cam grooves or undulating tracks $y$ (see Figure 4) are to be cut is mounted at the end of a hollow spindle $b$ which is movable endwise under the action of a weight $c$ attached by means of the chain or rope $d$ to a rod or spindle $e$ passing through the centre of the spindle $b$ and pulling upon the nut and collar $f$, $g$ by which the disc $a$ is held in place. Two concentric formers $h$, $i$ are provided on the spindle $b$ and a roller $j$ carried by the machine frame is adjusted to engage one or other former $h$ or $i$ according as the inner or outer groove track is being cut in the cam $a$. The weight holds the former against the roller. The latter is mounted upon a sleeve $u$ around the spindle $v$, the position of the sleeve being adjusted by threading the knurled nut $w$ upon the spindle. A pin and slot connection $x$ between the sleeve $u$ and spindle $v$ determine the limits of movement of the sleeve. The cam grooves are produced by a milling tool such as is diagrammatically illustrated in the drawing and indicated at $k$ of the desired shape and diameter to produce the path for the balls to roll in. We may employ a side milling tool such as suggested in the drawing. The tool is mounted upon a spindle $q$ carrying the spur wheel $r$ rotated by the pinion $s$ upon the pulley shaft $t$.

The formers $h$, $i$ may be shaped to produce one cam only, in which case they have to be rotated twice for each rotation of the shaft $b$ to produce two cam grooves for each rotation of the disc $a$. The rotation of the formers is obtained from the spindle $b$ through the back gears $m$, $n$, $o$ and $p$ in the illustrated example. The formers may, however, be made to produce in one rotation the required number of cam grooves $y$ in the disc $a$, when the formers will rotate with the spindle $b$.

Having now described our invention what we claim as new and desire to secure by Letters Patent is:—

1. A machine of the character described, a rotatable work carrying spindle, means supporting said spindle for rotary and longitudinal movements, a former having a plurality of engaging surfaces, a roller, means rotatably supporting said roller and mounted for adjustment in a relatively stationary part of the machine whereby it may be shifted for contact with either of the engaging surfaces of the former, and means normally moving the spindle in a direction to maintain engagement of the former with the roller.

2. In a machine of the character described, a spindle, means for securing a work piece to the terminal of the spindle, means supporting said spindle for rotary and longitudinal movements, a former mounted upon the spindle at the end opposite the work piece, a roller engaging the former to limit the end thrust of the spindle in one direction, and means connected with the work securing means at the end opposite the work piece and normally tending to move the spindle axially to maintain contact of the roller with the engaging surface of the former.

3. In a machine of the character described, a work carrying spindle mounted for rotary and longitudinal movements, a former rotatably mounted upon the spindle, and means for driving the former at a speed varying from that of the spindle.

4. In a machine of the character described, a work carrying spindle mounted for rotary and longitudinal movements, a former rotatably supported upon the spindle, means coacting with the former to shift the spindle axially during rotary movement of the former, and a driving connection between the spindle and the former for driving the latter at a speed different with respect to the speed of the spindle.

5. In a machine of the character described, a work carrying spindle mounted for rotary and longitudinal movements, a former mounted for rotary movement on a spindle, means coacting with the former to shift the spindle axially during rotary movement of the former, and a driving gear connecting the spindle with the former for controlling the rate of speed of the latter with respect to the rate of speed of the spindle.

6. In a machine of the character described, a work carrying spindle mounted for rotary and longitudinal movements, a former rotatably supported upon the spindle whereby the former may be driven at a speed differing from that of the spindle, and means coacting with said former to effect longitudinal movement of the spindle incident to rotation thereof.

7. In a machine of the character described, a spindle, means supporting said spindle for rotary and longitudinal movements, a removable former supported upon and rotatable independently of the spindle, and means coacting with the former to effect longitudinal displacement of the spindle incident to rotation thereof.

8. In a machine of the character described, a spindle, means for supporting said spindle for rotary and longitudinal movement, means for securing a work piece to one terminal of the spindle, a former removably applied to the opposite end of the spindle, a roller engaging said former, a support for said roller slidably mounted in the supporting means, and means connected with the former carrying terminal of the spindle for normally tending to move the latter in the direction of said roller.

In testimony whereof we have signed our names to this specification.

JOSEPH HIGGINSON.
HUBERT ARUNDEL.